(12) United States Patent
Poletin et al.

(10) Patent No.: US 10,019,630 B1
(45) Date of Patent: Jul. 10, 2018

(54) DYNAMIC CLASSIFICATION SYSTEM FOR SPORTS ANALYSIS

(71) Applicant: SAP SE, Walldorf (DE)

(72) Inventors: Lea Poletin, Walldorf (DE); Maximilian Rickayzen, Wiesloch (DE)

(73) Assignee: SAP SE, Walldorf (DE)

( * ) Notice: Subject to any disclaimer, the term of this patent is extended or adjusted under 35 U.S.C. 154(b) by 31 days.

(21) Appl. No.: 15/401,566

(22) Filed: Jan. 9, 2017

(51) Int. Cl.
 *G06K 9/00* (2006.01)
 *G06K 9/46* (2006.01)

(52) U.S. Cl.
 CPC ....... *G06K 9/00724* (2013.01); *G06K 9/4604* (2013.01)

(58) Field of Classification Search
 CPC .. H04N 7/181; H04N 21/4722; H04N 21/812; H04N 21/21805
 USPC ............... 382/190, 201, 209, 224, 226, 228; 473/493, 479, 416
 See application file for complete search history.

(56) References Cited

U.S. PATENT DOCUMENTS

| | | | | |
|---|---|---|---|---|
| 6,504,580 B1 * | 1/2003 | Thompson | ............ | G06F 3/147 340/13.31 |
| 8,432,489 B2 * | 4/2013 | Arseneau | ............ | G06F 1/1626 348/157 |
| 8,645,995 B2 * | 2/2014 | Ferris | ............ | H04H 20/33 348/552 |
| 8,696,482 B1 * | 4/2014 | Pedenko | ............ | A63B 69/3632 473/221 |
| 8,781,610 B2 * | 7/2014 | Han | ............ | A63B 69/3623 463/20 |
| 8,989,441 B2 * | 3/2015 | Han | ............ | G06T 7/20 382/103 |
| 9,060,682 B2 * | 6/2015 | Lokshin | ............ | A61B 5/0022 |

\* cited by examiner

*Primary Examiner* — Yosef Kassa

(74) *Attorney, Agent, or Firm* — Buckley, Maschoff & Talwalkar LLC

(57) ABSTRACT

Provided are devices and methods for rating video scenes from a sporting event. In one example, the method includes receiving data of a plurality of rated sports scenes, normalizing the data of the plurality of rated sports scenes into a plurality of data points, and forming at least two rating groups of data points in dimensional space, normalizing an unrated sports scene into a data point, determining a rating for the unrated scene by comparing the data point of the unrated scene to the at least two rating groups of data points, and outputting information about the determination to a display of a user device. According to various embodiments, the device and method may learn from a few plays manually rated by a coach and apply the coach's learned philosophy automatically to a plurality of unrated plays.

20 Claims, 7 Drawing Sheets

FIG. 4
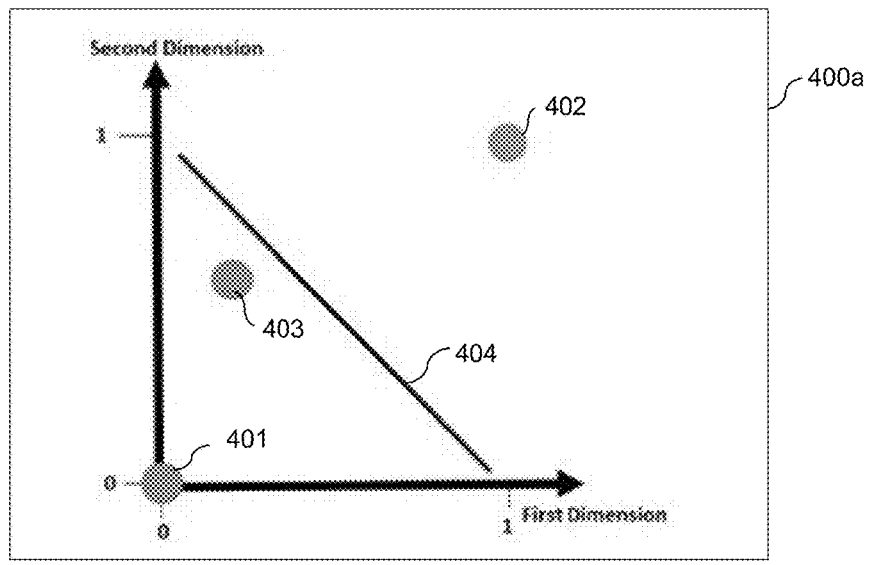
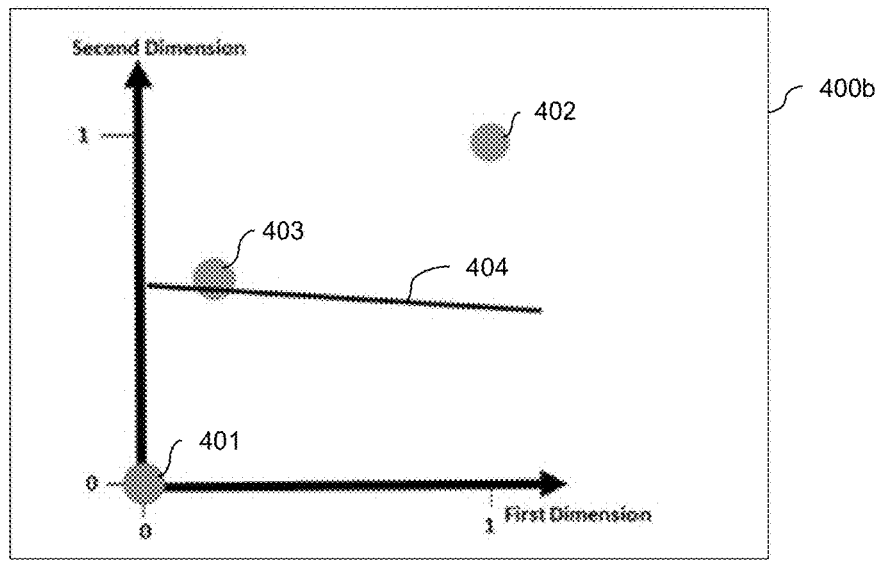

FIG. 7

| Time | Rating | # Players Over | Speed (mph) | Direction |
|---|---|---|---|---|
| 2:54 | 2 | 2 | 5 | Lateral |
| 7:33 | 4 | 6 | 7 | Goal |
| 12:21 | 1 | 1 | 2 | Away |
| 18:17 | 3 | 4 | 5 | Goal |
| 25:58 | 3 | 5 | 6 | Goal |
| 34:06 | 4 | 7 | 6 | Goal |

DYNAMIC CLASSIFICATION SYSTEM FOR SPORTS ANALYSIS

BACKGROUND

Sporting events and sports in general provide entertainment for fans, participants, and viewers alike. Football (also referred to as soccer) is one of the most popular sports in the world. Football is a fast team game in which strategy plays an important role. The game is also constantly changing and developing in style. From game to game, coaches optimize their strategies in an effort to give their team the best chance to win. Before each game, a coach often envisions a plan on how to beat the opponent. To do so, a coach may analyze the playing style of their opponents, uncover weaknesses and/or strengths of their opponents, identify areas where their own team needs to improve, and the like. Based on this knowledge, the coach may develop a game plan and further instruct their team on how to implement the game plan through various drills, practices, and exercises.

Video sessions are widely used to evaluate scenes of past games and to educate coaches and players on their opponents and on their own playing style. For example, videos of previous games can be viewed to identify periods of play that a coach wants their team to duplicate and periods of play that the coach is disappointed with. Also, video of an opponent can be viewed and analyzed to discover potential strategies for beating the opponent. However, manually viewing game film, identifying plays, and explaining why the play is of importance can be time consuming. Often, a football match can take 90 minutes or more. In some case, the coach may watch the video of a match in its entirety to identify the most significant plays from the match that the coach wants to emphasize which can take a significant amount of time. Furthermore, the coach may fast-forward and rewind to specific points in the match when going over the video to speed up the process but may accidentally skip over plays of interest as a result.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 4 is a diagram illustrating a process of changing weights among dimensions in a feature space, in accordance with an example embodiment.

FIG. 7 is a diagram illustrating an output of information about sports scenes that have been rated in accordance with an example embodiment.

Figure 1:
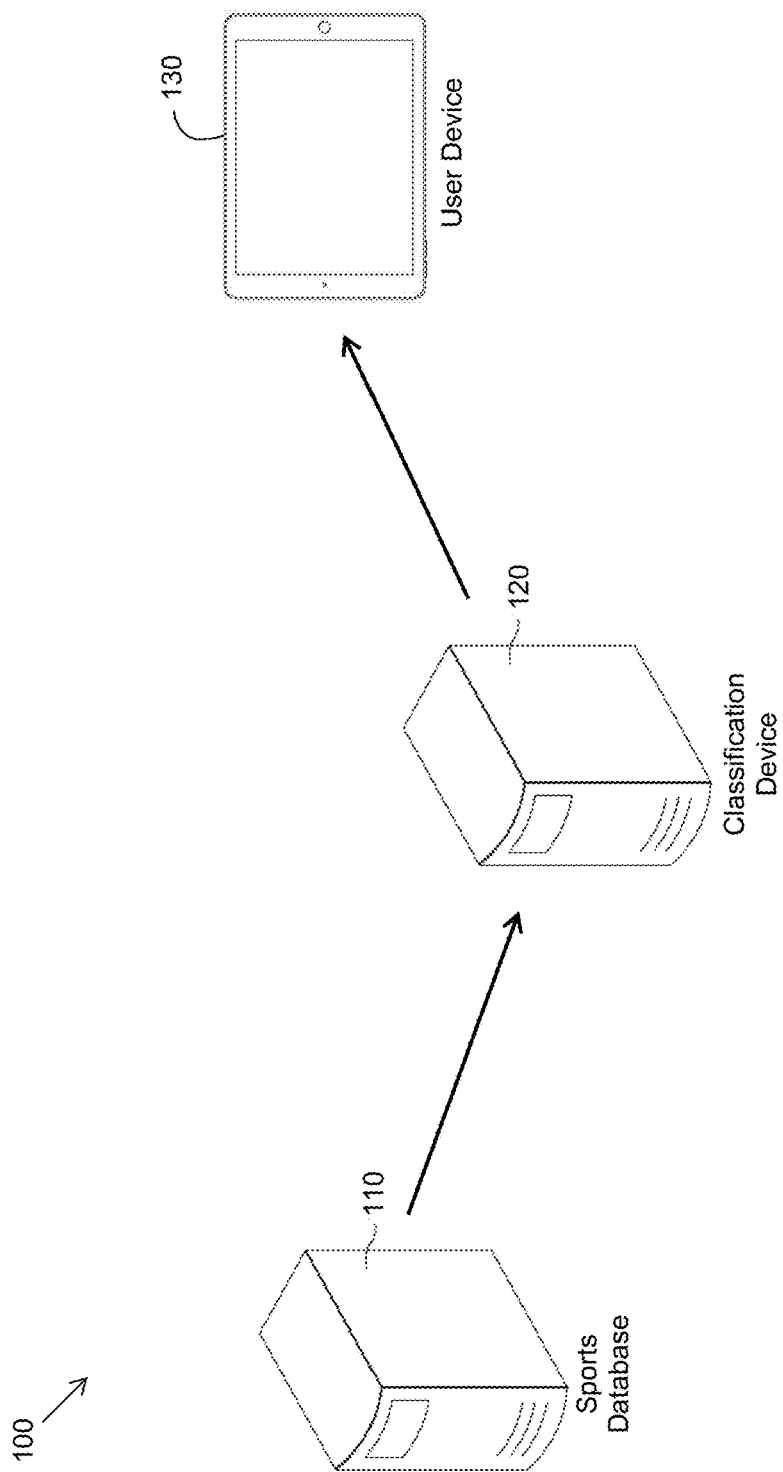
FIG. 1 is a diagram illustrating a system for classifying sporting scenes in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The examples described herein are directed towards a sports scene classification system and application. Sporting events, for example, soccer games, football games, baseball games, and the like, are often recorded as video that is capable of being viewed at a later time for learning purposes. Coaches or other viewers may be interested in looking at certain types of plays or scenes from a game. The examples herein provide a system that can receive any kind of play/scene of interest rated by a coach or other user, learn from various attributes/features of the rated play, and automatically provide a rating for other plays based on the learning. According to various aspects, a user such as a coach may manually rate a plurality of scenes of video content. The ratings may be classified into a plurality of rating groups or classes based on the user's subjective interests. Examples of rating classes include numerical ratings such as a rating of 0 for bad and a rating of 5 for good, or the rating classes such as relevant, non-relevant, or the like. The application may receive the ratings and data (such as XML data) about the plurality of video scenes, as input, learn from the input, and generate a classification mechanism based on the input. The classification mechanism can be used to classify unrated sports scenes. For example, the classification application can generate a numerical rating, or rate scenes as relevant or non-relevant, etc. In the examples herein, scenes from a soccer game are classified into rating groups, however, it should be appreciated that the classification application described herein may be applied to any type of sports scene by modifying the features (i.e., dimensions) that are analyzed by the application.

The classification application may learn dynamically based on multiple factors. For example, different ratings of the same scenes can be provided as different inputs by different users and the application will learn differently from the different inputs thereby creating different and dynamic results. As a result, subjective preferences of a user can be used to train the system. The features that are used in the classification can be dynamically chosen by the application and system based on the type of play or scene. The user does not need to provide features of the play that are more important than others. Instead, the system can automatically identify certain features that should be given more weight when performing the rating based on features of the manually rated scenes input by the user. For example, an attacking pass in a soccer match has different features than a possession-maintaining pass. When identifying relevant attacking passes, the application may identify different features in comparison to features that are used to identify relevant possession maintaining passes. Also, a weight given to each feature may be adjusted differently by the application, for example, based on a coaches/user's interests detected from the manually rated plays resulting in different ratings. For example, a feature of how close a receiver is to goal may be given more weight than a feature such as how many opposing players are overcome by the pass. Thus, these features can be automatically detected from the plays which have been manually rated by the coach and different weightings may be generated for each feature of unrated scenes by the application when determining a rating for the unrated scenes.

FIG. 1 illustrates a system 100 for classifying sporting scenes in accordance with an example embodiment. In this example, sports scenes from a soccer game/practice may be analyzed, but the embodiments are not limited thereto. Referring to FIG. 1, the system 100 includes a sports database 110, a classification device 120, and a user device 130 which may be connected to each other directly or through a network such as the Internet or a private network. In this example, the sports database 110, the classification device 120, and the user device 130 are shown separately for convenience of explanation, but it should be appreciated that the any of the devices/databases may be integrated together. As another example, one or more of the devices/databases may be included as instances in a cloud platform.

The sports database 110 may store data about a plurality of scenes from a plurality of sporting events. For example, the data may be generated based on video content. As a non-limiting example, the data about the plurality of scenes may include detailed sports data provided by Opta Sports, DFL Sports, or the like, which may be generated based on video content. The data may be stored in a table form, or the like, and may be included in document, a spreadsheet, or the like. In some examples, the data is stored in Extensible Markup Language (XML) format. In some examples, the data may include various metadata regarding the scene. An example of the sports data is shown and described with respect to FIG. 2.

According to various embodiments, the classification device 120 may host a classification application that is configured to rate sports scenes of video content. In various embodiments, a scene may be assigned to a rating group among a plurality of groups such as good, bad, relevant, irrelevant, or any other rating methodology that is desired. In some examples, the rating groups may include numeric values which may be assigned to scenes where '1' may be the lowest possible rating group and '4' (or other desired number) may be the highest possible rating group, with other rating groups available between. The classification application described herein is capable of learning from rated scenes that have been manually rated, for example, by a coach, an expert, a user, or the like. The application may generate an auto-classification mechanism based on the learned input that may be used to classify unrated sports scenes based thereon. Through this approach, a game philosophy of a coach may be learned by and integrated into the classification application.

The sports database 110 may provide sports data corresponding to a plurality of sports scenes to the classification device 120. For example, the scenes may be from video content including sports scenes such as a game, a plurality of games, a portion of a game, a practice, and/or the like.

Although not shown in FIG. 1, the classification device 120 may include or may be connected to a display that allows the user to watch the sporting scenes and one or more input units (e.g., mouse, keyboard, touchpad, etc.) that allows the user to manually rate scenes by inputting commands via the classification device 120. As another example, the user device 130 may receive the scenes and a user thereof may rate the scenes. As another example, the sports data may already include rating for the received sports scenes. Based on the rated sports scenes, the classification application may generate a classification model (e.g. that can be used to rate unrated sports scenes). The classification model may provide results based on the rated scenes received as inputs thereby identifying a rating for sports scenes based on how the user would classify the scenes.

According to various embodiments, one or more relevant factors or features that are likely to be included in a sports scene may be defined by the classification application and used to classify unrated sport scenes. For example, for a passing play in video content, the following predetermined features may be included in the related data provided by the sports database and used to classify the passing play: a number of overplayed opponents, a receiving player's speed in goal direction, a receiving player direction, a number of opponents within a predetermined distance of the receiving player, a number of opponents between the receiving player and the goal, number of close opponents, a distance from the receiving player to an offside line, and the like. Each predetermined feature may be identified for each passing play from with the sports data. Using one or more of these features from the data received from the database 110, the classification device 120 can represent the plays/scenes in a multidimensional feature space as data points where each feature of the play represents a respective dimension in the feature space. That is, the classification device 120 may convert the sports data (e.g., XML data) in which a plurality of features are described into data points in a feature space.

For example, if a scene has five predetermined features of interest (e.g., number of opponents overplayed, number of opponents between receiver and the goal, closeness of the opponents, receiving player's speed, and receiving player's direction), the feature space will have five dimensions. Accordingly, a data point represents an intersection of the five dimensions. In order to represent the data points in the feature space, the data may be normalized. Because the predetermined features have individual different ranges, they may be made comparable to one another through the normalization. For example, each feature may be adjusted to a value between a range of zero (0) to one (1), thus, the dimensions for all features will be in the range of 0 to 1 after normalization. An example of a normalization equation is shown below:

$$newValue = \frac{oldValue - \min(featue)}{\max(feature) - \min(feature)} \qquad \text{(Equation 1)}$$

In this example, Equation 1 may be used to fit each feature within a range of 0 to 1 thus fitting all features in the same sized space in the feature space. While it may be difficult to visualize a data point in five-dimensions, the data may be represented in two-dimensions (X-axis and Y-axis) for convenience of illustration and explanation. Next, the classification device 120 may divide the feature space in order to separate scenes (i.e., the data points) into multiple rating groups. After normalizing, the manually rated data points received as input may be used to form multiple rating groups. For example, an average of all scenes within one rating group may be represented by a center of data points in the feature space corresponding to that rating group. After that, weights of the features of a rating group may be determined. The weights may assign more importance to one or more dimensions within the feature space and may help distinguish rating groups within the data points. Beginning with the initial weighting, the rated data points may be assigned to a rating group that has a center that is closest to the data point and then the weights may be adjusted.

In some of the examples herein, the scenes are divided or otherwise formed into a first rating group representing scenes that are relevant to a user and a second rating group representing scenes that are not relevant to a user but it should be appreciated that more than two rating groups may be provided. As another example, rating groups may be represented by numerical values (e.g., 1, 2, 3, 4, etc.) in which each numerical value represents a respective rating group. Also, other ratings may be chosen by a user. Based on the rating groups, unrated scenes can be rated based on where data points of the unrated plays are located within the feature space in comparison to the data points of the rating groups. Furthermore, information about the unrated scenes may be output from the classification device 120 to the user device 130. Here, the output information may include a clip of the scene, a description of the features and the values for the features in the particular scene, and the like.

Figure 2:
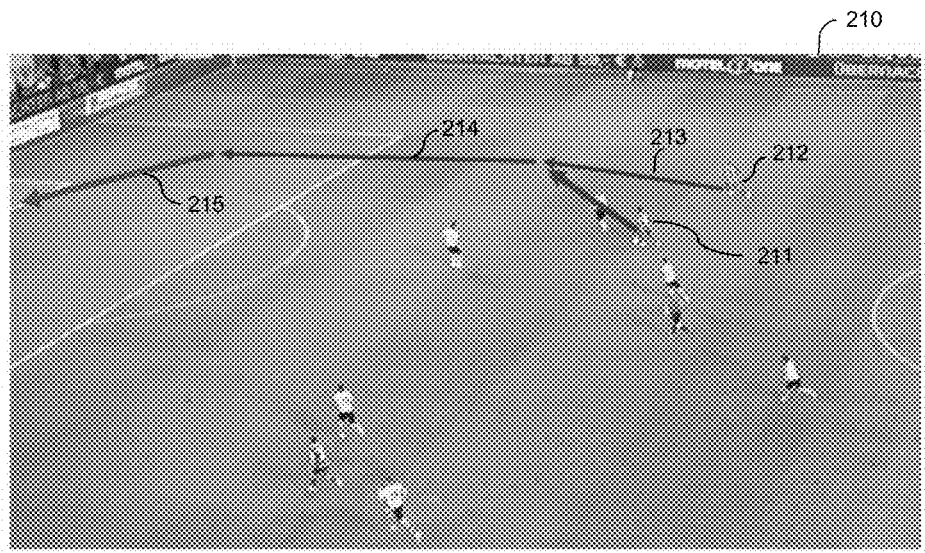
FIG. 2 is a diagram illustrating an example of data associated with a sporting scene in accordance with an example embodiment.

FIG. 2 illustrates an example of data associated with a sporting scene in accordance with an example embodiment. Referring to FIG. 2, image 210 is a part of a larger group of images that make up a scene of video content representing a play from a sporting event. In this example, the scene is video content from a soccer match in which a passing player 211 makes a pass to a receiving player 212. Although not shown, the video content continues with additional images of the scene, but for convenience only one still image 210 of the scene is shown. In this case, line 213 represents the path of the receiving player 212 until the receiving player receives the ball from the passing player 211, line 214 represents the receiving player 212 dribbling with the ball until a shot is taken, and line 215 represents the shot taken by the receiving player. The scene (also referred to as an event) may be converted to data representing the scene, for example, XML data, or the like, by the sports database 110 or some other database/server.

As shown in data window 220, data from the video content including image 210 may be represented by textual data as shown in data window 220. The data included in data window 220 may describe one or more predetermined features of the scene. For example, the database may store sports related data provided by Opta which is a data provider for various sports. Besides soccer, other sports like handball, basketball, American football, rugby and tennis are supported by Opta and other similar entities. Opta may collect, package, and distribute sports data to be used by the example embodiments. For example, for a soccer match, Opta may detect events of a soccer match such as passes, shots on goal, and the like, and convert the events into XML based data. In one example, the data may be stored and delivered in XML-format. Here, the data may have a structure as shown in window 220. Although Opta is one example of a provider of such data, the embodiments are not limited thereto and the data may be converted by other entities such as DFL Sports Enterprises, or may be converted by the database itself, or the like.

The example image 210 is from a scene which includes a passing play in which a pass is made from player 211 to receiving player 212 leading to a goal being scored during a match between two opposing teams. In the data 220, an event has an id and a type. The type may indicate the kind of event such as a pass, a shot, a scoring chance, or the like. Further, time and location of the events are provided. The example in data window 220 includes an event with the "type id"='1'. This indicates that the event is a pass. In this example, the pass occurred at '41' minutes and '52' seconds after kickoff as indicated by the time stamp. Player 211, who is the player with the id '105835,' passed the ball. A mapping of player ids to player names may be additionally delivered, for example, in a separate file. The outcome shows that the pass was completed and not intercepted. The location from where the pass started is given by x and y coordinate values. Accordingly, the data included in data window 220 may define the predetermine features of the scene such as a number of overplayed opponents, a receiving player's speed in goal direction, a receiving player direction, a number of opponents within a predetermined distance of the receiving player, a number of opponents between the receiving player and the goal, number of close opponents, a distance from the receiving player to an offside line, and the like.

For some events, as is the case with passing plays, further qualifiers may be given that provide more information about the event. As an example, the qualifier '140' gives the x coordinate of where the pass was received, '312' the length of the pass, '56' what zone the event happened in, and '313' the angle of the pass relative to the direction of play. There are plenty more qualifiers for this and other types of events. For many events, certain parts of the field are also divided into zones. Furthermore, exact begin and end times of a scene may be determined and provided, for example, a point in time when the pass happened and a point in time when the pass was received. In addition to the data shown in FIG. 2, the embodiments also include video data or a video feed of the actual scenes that may be provided along with the XML data. Accordingly, a user can watch the video feed and rate the plays. For example, the plays can be rated using R Studio, and the like, via the classification device 120 or the user device 130 shown in FIG. 1.

Figure 3:
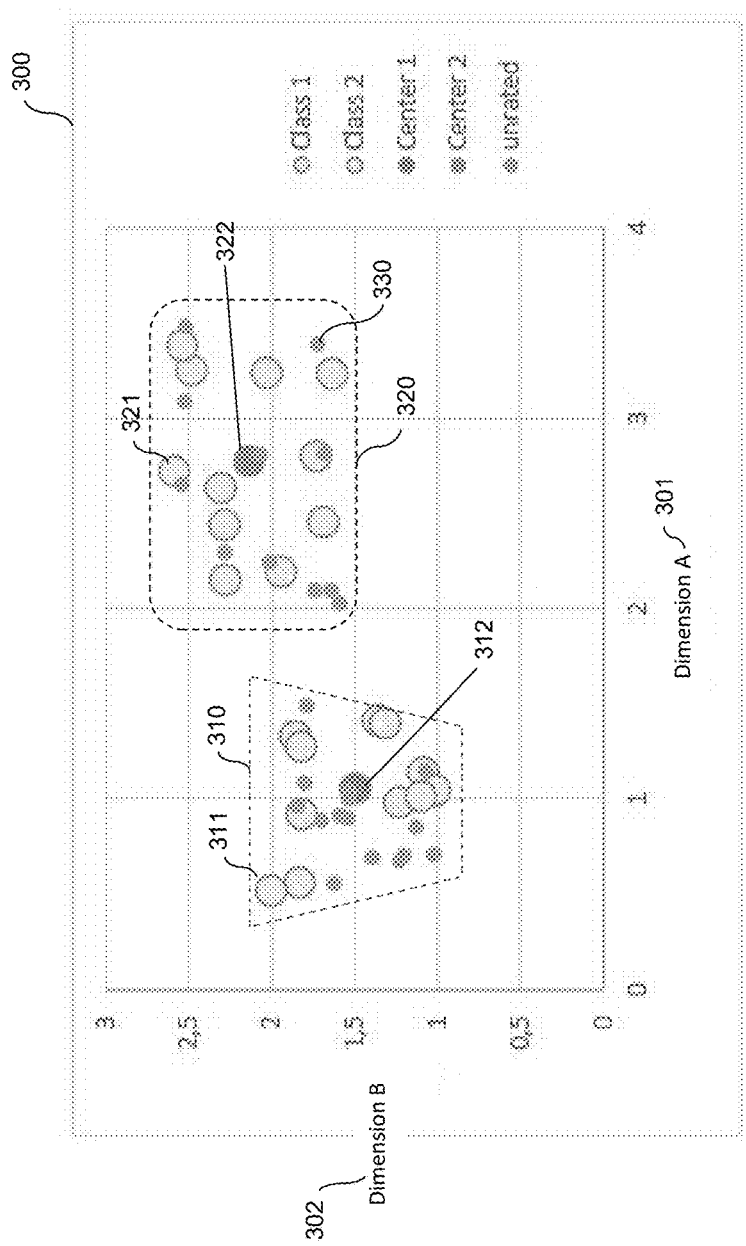
FIG. 3 is a diagram illustrating a clustering of multidimensional data points in a feature space, in accordance with an example embodiment.

FIG. 3 illustrates a clustering of multidimensional data points corresponding to sports scenes, in accordance with an example embodiment, and FIG. 4 illustrates a process of changing weights among dimensions in a cluster graph in accordance with an example embodiment.

Referring to FIG. 3, a user interface 300 includes a two-dimensional (2D) graph representing a 2D feature space and includes a plurality of data points represented within the feature space. In this example, a first dimension 301 of the graph is represented by feature A and a second dimension 302 of the graph is represented by feature B. In this example, two rating groups are used including a first rating group of non-relevant scenes identified by a first cluster 310 of data points and a second rating group of relevant scenes identified by a second cluster 320. That is, in this example the first cluster 310 (or group) of data points 311 represent non-relevant data points and the second cluster 320 of data points 321 represent relevant data points. The clusters 310 and 320 may be formed by the classification application described herein. While there may be some outliers, the data points in each cluster may be initially formed near to one another in a group and may be further enhanced based on weighting of features in the feature space performed by the application. Furthermore, the more dimensions that are used, the finer tuned the clustering process may be. The data points 311 and 321 are generated by normalizing data of a plurality of sports scenes, for example, XML data, or other types of data. The normalization process may convert values of any type into values between '0' and '1' for normalization, or some other arbitrary normalization values.

In the example of FIG. 3, each cluster 310 and 320 includes a representative data point 312 and 322, respectively. For example, the representative data points 312 and 322 may correspond to centroids or centers of the clusters 310 and 320, respectively. However, this is merely an example and other clustering techniques may be used. In FIG. 3, representative data point 312 is a representative data point of a non-relevant scene and representative data point 322 is a representative data point of a relevant scene. As another example, the clusters may represent specific numerical ratings values, for example, between 0 and 4, and the like. Furthermore, in this example, a plurality of data points 330 are shown which correspond to unrated scenes. The classification application may analyze a location of a data point 330 corresponding to an unrated scene and determine whether the data point 330 corresponds to a relevant scene or a non-relevant scene based on the clusters 310 and 320, the data points 311 and 321, and/or the representative data points 312 and 322. In some cases, only the clusters 310 and 320 may be used, only the representative data points 312 and 322 may be used, or only the data points 311 and 321 may be used. However, in some cases, more than one of these attributes may be used to classify or rate a data point of an unrated scene. As an example, an unrated scene of video represented by data point 330 may be determined to be a relevant scene because the data point 330 may be determined as being within the cluster 320 of data points corresponding to the relevant scenes. As another example, the data point 330 may be determined to be a relevant scene because data point 320 may be closer to the representative data point 322 of cluster 320 than the representative data point 312 of cluster 310, based on weightings assigned to dimensions in the feature space by the application.

Referring to FIG. 4, an example is shown of adjusting the weights of features within the feature space thereby adjusting the clustering and the classification process for unrated scenes. In this example, graph 400a includes a representative data point 401 that represents a non-relevant scene and a representative data point 402 that represents a relevant scene. In 400a, each of the dimensions are given the same weight within the feature space (1 to 1). Here, a line 404 divides the feature space between the relevant scenes and the non-relevant scenes and may be used to quickly determine a rating for unrated scenes. In this example, data point 403 corresponding to an unrated scene is located on the side of the line 404 closest to the representative data point 401 that represents the non-relevant scene. Accordingly, the data point 403 is determined to be a non-relevant scene because the data point 403 is closer in distance to the representative data point 401 than the representative data point 402.

However, because data points within one rating group can be relatively scattered, it may be difficult to form clusters based on the initial data. According to various embodiments, by adjusting the distance measure based on weights the distance of points within one rating group or the distance of a data point to the center of its rating group may be reduced. For example, the classification application may identify features that provide more impact for differentiating the rating groups and assign a higher weight to those features so the distance between representative data points of different groups is increased, and assign a lower weight to less important features. For example, in graph 400b, the first dimension and the second dimension are not weighted equally. Instead, the second dimension is given significantly more weight than the first dimension (5 to 1) by the classification application. As a result, the line 404 is arranged differently as a result of the different weightings. In this example, the data point 403 is now on the side of the line 404 closest to representative data point 402 that represents relevant scenes. Accordingly, data point 403 is determined to be a relevant scene in graph 400b. Furthermore, data point 403 is determined to be closer to representative data point 402 instead of representative data point 401 as a result of the weighting.

Figure 5:
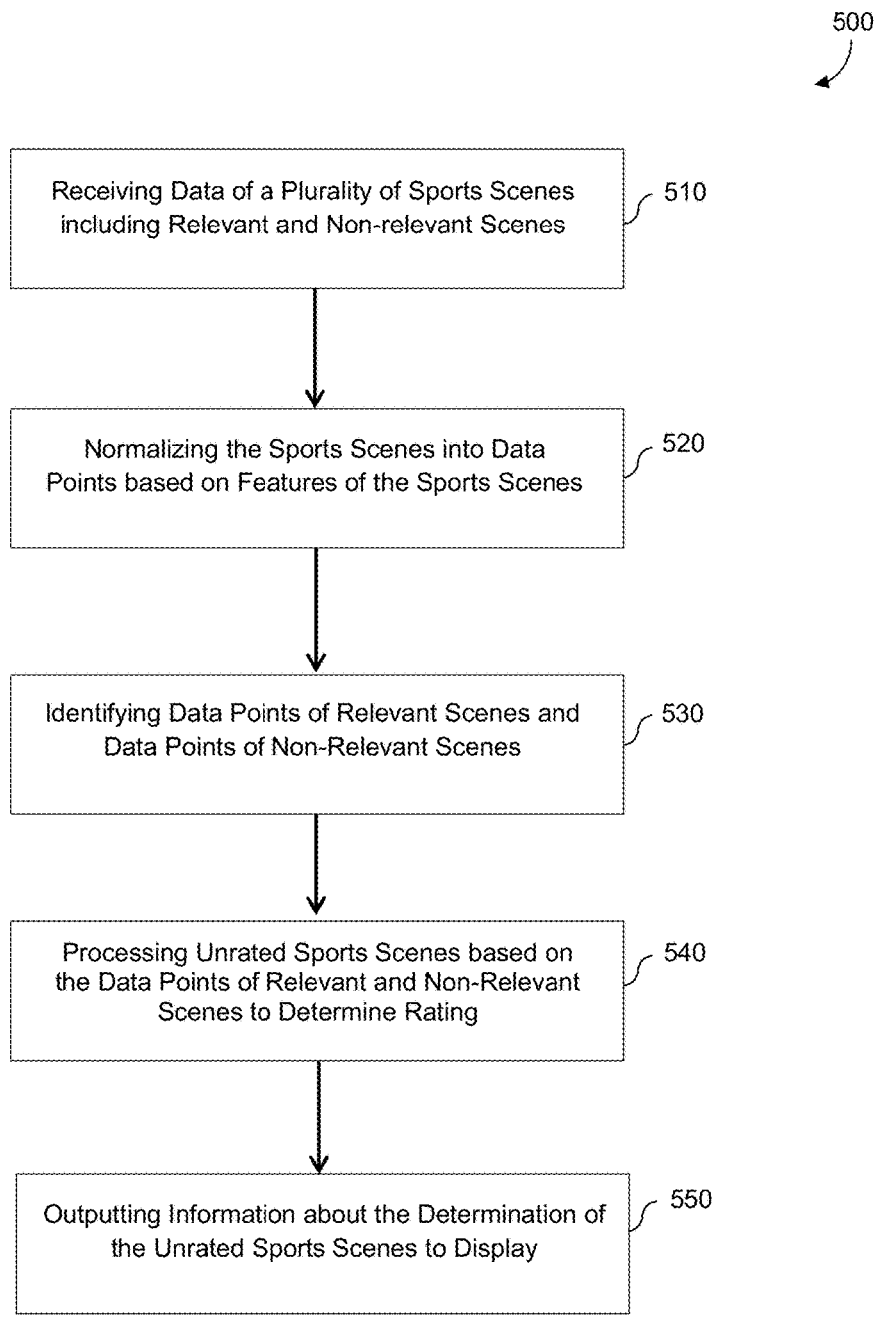
FIG. 5 is a diagram illustrating a method for classifying sports scenes in accordance with an example embodiment.

FIG. 5 illustrates a method 500 for classifying sports scenes in accordance with an example embodiment. For example, the method 500 may be performed by the classification device 120 shown in FIG. 1, or another device. Referring to FIG. 5, in 510, the method includes receiving data of a plurality of sports scenes including scenes rated as relevant and scenes rated as non-relevant. In this example, the scenes may be rated manually by a user such as a coach or an expert. The ratings may be performed using a software program such as R Studio, or the like. The ratings may include a rating of relevant or non-relevant. As another example, the ratings may include a range of ratings, for example, 0 to 5 where 5 indicates a rating of most relevant and 0 indicates a rating of least relevant. The data for each scene may include XML data. The XML data may also include an indication of the rating, or the rating may be appended to the XML data subsequently.

In 520, the method includes normalizing the data of the plurality of sports scenes into a plurality of data points. For example, the normalizing may include generating a data point in multi-dimensional space for each scene based on predetermined features included in the scene. In 530, the method further includes identifying or forming a group of data points corresponding to the relevant scenes and a group of data points corresponding to the non-relevant scenes. During the normalization in 520, values of the features are made comparable and therefor normalized to be between 0 and 1, or some other range. After normalizing, the manually rated data points are used to form the rating groups in 530. As one example, the average of all scenes within one rating group is represented by a center of the data points corresponding to that rating group. After that, weights of the features may be determined. The weights may assign more importance to dimension within the feature space for determining distance. Beginning with the initial weighting, the rated data points may be assigned to their closest center and then the weights may be adjusted.

For example, a higher value between 0 and 1 may be assigned to a feature value that has more relevance to a user (e.g., a receiving player that is closer to goal, a greater number of overplayed opposing players, etc.) and a lower value may be given to a feature value that is less relevant (e.g., a receiving player is farther from goal, a smaller number of overplayed players, etc.), or vice versa. That is, weights may be assigned to the normalized values to further differentiate the data points into rating groups. As a result, based on a position of the data point in the graph, in 530 it may be quickly identified whether the data point corresponds to a relevant scene or a non-relevant scene. The normalizing the data of each sports scene may be performed based on a plurality of predetermined features of the scene. In an example in which the sports scene represents a passing play in a soccer game, the predetermined features may include at least one of a number of overplayed opponents, a receiving player's speed in a goal direction, a receiving player direction, a number of opponents within a predetermined distance of the receiving player, a number of opponents between the receiving player and the goal, a distance to an offside line, and the like. Each of these features may be given a value between zero and one and used to plot the data point. Furthermore, some features may be adjusted (weighted) to further differentiate the rating groups. By weighting features, various dimensions within the feature space may be given more weight (such as shown in the example of FIG. 4).

Clustering may be used to identify the representative scenes. For example, the determining in 530 may include forming a cluster of the data points of the relevant scenes and a cluster of the data points of the non-relevant scenes, and determining a representative data point of a relevant scene from the cluster corresponding to the relevant scenes and a representative data point of a non-relevant scene from the cluster corresponding to the non-relevant scenes. The clustering may be performed after the weighting of the features in the feature space which can help to generate the clusters. Here, a center of the cluster of data points of the relevant scenes may be determined as the representative data point of a relevant scene, and a center of the cluster of data points of the non-relevant scenes as the representative data point of the non-relevant scene.

In 540, the method includes processing data of one or more unrated sports scenes to determine whether the unrated sports scenes are relevant or non-relevant based on the data points of the relevant scenes and the data points of the non-relevant scenes. For example, in 540 the method may include normalizing an unrated sports scene similar to the normalization process performed in 520. In some examples, the normalization in 520 of the rated scenes may occur simultaneously as the normalization of unrated scenes, but the embodiments are not limited thereto, and one may be normalized before the other. The normalized data point of the unrated scene may be compared to the data points of the relevant scenes and the non-relevant scenes to determine whether the unrated scene should be classified as a relevant scene or a non-relevant scene. As one example, the unrated sports scene may be determined as a relevant scene or a non-relevant scene based on whether the respective data point of the unrated scene is closer in distance to the representative data point of the relevant scene or closer in distance to the representative data point of the non-relevant scene. Here, the distance (i.e., the closeness) may be determined based on the weights previously identified for each feature in the feature space. In other words, whether the data point of the unrated scene is closer to the relevant scene data point or the non-relevant scene data point may be determined by the weighting of different features in the feature space. As a result, a first dimension in the feature space corresponding to a first feature may be assigned more weight than a second dimension in the feature space corresponding to a second feature.

Furthermore, in 550 the method includes outputting information about the determination of the unrated sports scene to a display of a user device. For example, the outputting may include outputting a table of information having a plurality of rows and a plurality of columns such as shown in FIG. 7. Here, each row in table 700 of FIG. 7 may represent an unrated scene and the plurality of columns in table 700 may represent a plurality of predetermined features of the unrated scene, respectively. For example, the output features may include a time at which the play occurred, a rating number or value, and information about other predetermined features such as a number of overplayed opponents, a receiving player's speed in a goal direction, a receiving player direction, a number of opponents within a predetermined distance of the receiving player, a number of opponents between the receiving player and the goal, and a distance to an offside line, and the like.

Figure 6:
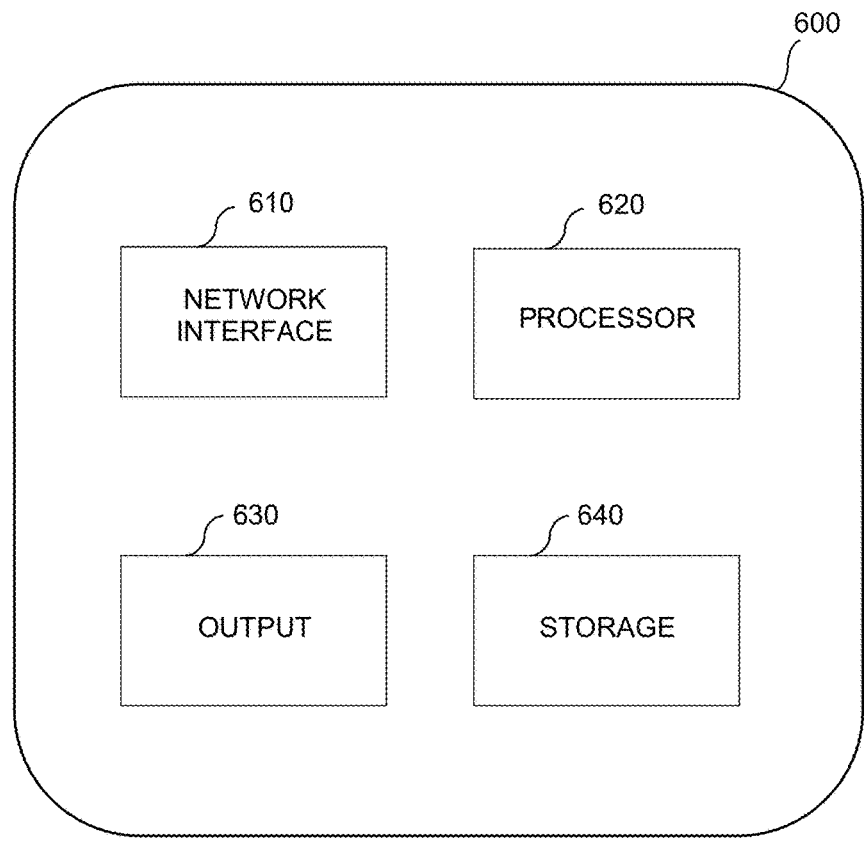
FIG. 6 is a diagram illustrating a device for classifying sports scenes in accordance with an example embodiment.

FIG. 6 illustrates a device 600 for classifying sports scenes in accordance with an example embodiment. For example, the device 600 may be the classification device 120 shown in FIG. 1. Also, the device 600 may perform the method 500 of FIG. 5. Referring to FIG. 6, the device 600 includes a network interface 610, a processor 620, an output 630, and a storage device 640. Although not shown in FIG. 6, the device 600 may include other components such as a display, an input unit, a receiver/transmitter, and the like. The network interface 610 may transmit and receive data such as video content and other sports related data over a network such as the Internet, a private network, a public network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The output 630 may output data to an embedded display of the device 600, an externally connected display, a cloud, another device, and the like. The storage device 640 is not limited to any particular storage device and may include any known memory device such as RAM, ROM, hard disk, and the like.

For example, the network interface 610 may receive a plurality of sports scenes in the form of video content as well as data about the plurality of sports scenes from an external database, server, or the like. The storage device 640 may store the video content and the data of the plurality of sports scenes. The scenes may be rated as relevant scenes and non-relevant or irrelevant scenes. For example, the scenes may come already rated, or a user of the device 600 may rate the scenes using a display device and an input unit embedded or otherwise connected to the device 600 (not shown). The processor 620 may normalize the data of the plurality of sports scenes into a plurality of data points based on predetermined features of the scenes. For example, the processor 620 may normalize the data of each sports scene based on a plurality of predetermined features included within the video content of the sports scene to generate a data point in a multidimensional feature space for each scene. In this example, each predetermined feature represents a dimension in the feature space. Therefore, if the scene includes three features, the data points may have a three-dimensional representation. Furthermore, the processor 620 may form data points of the relevant scenes and data points of the non-relevant scenes into groups based on the position of the data points in a feature space such as a multidimensional graph or chart.

The processor 620 may also normalize an unrated sports scene into a data point, and determine whether the unrated sports scene is a relevant scene or a non-relevant scene by comparing the data point of the unrated scene to the data points of the relevant scenes and the non-relevant scenes. According to various embodiments, the data points of the relevant scenes may be clustered together while the data points of the non-relevant scenes may be clustered together. Each of the clusters may occupy separate spaces in the feature space. When determining whether the data point of the unrated scene corresponds to a relevant scene or a non-relevant scene, the processor 620 may compare a location of the data point of the unrated scene to the cluster of data points of relevant scenes and the cluster of data points of non-relevant scenes.

In some cases, the processor 620 may determine a representative data point of a relevant scene from the cluster corresponding to the relevant scenes and a representative data point of a non-relevant scene from the cluster corresponding to the non-relevant scenes. For example, the representative data point may be a center or a centroid of a cluster. To determine whether an unrated scene is relevant or non-relevant, the processor 620 may compare a distance of the data point representing the unrated scene to the centroid of the cluster of relevant data points and the center of the cluster of non-relevant data points. In this case, if the data point of the unrated scene is closer to the centroid of the cluster of relevant data points, the unrated scene may be determined as relevant, and vice versa. Also, the distance in this case may be determined based on weights assigned to various features/dimensions within the feature space.

The output 640 may output information about the determination of the unrated sports scene to a display such as an embedded display or a display of a user device that is connected to the device 600 via a network such as the Internet or a private network. For example, the output 640 may output information such as a table comprising a row representing the unrated sports scene, and a plurality of columns representing a plurality of predetermined features of the unrated sports scene. In some cases, the output 640 may also embed a link or a button which when selected may play video content corresponding to a particular play or scene. For example, in FIG. 7, table 700 includes a plurality of plays represented by rows and each play has a plurality of features and a ranking which are represented by a plurality of columns. In this example, each play also includes a link (e.g., link 701) that may be selected by a viewer which navigates the viewer to a video of the corresponding content associated with the play.

As another example, instead of plotting data points in multidimensional space, the rating/classification application may be based on a neural network. The neural network may be implemented using a back propagation network. The input to the network may be scenes (e.g., passing plays) with a rating. The rating may be scaled between a range of values, for example, from 0, a bad play to 3, a good play. Tracking information about the plays may be provided by Opta, DFL sports, and/or the like. With the tracking data and the rating the neural network can adjust weights of dimensions using the back propagation algorithm. During the learning process with the neural network, the weights of the nodes may be adjusted. After the net is trained it can be used to rate unrated plays because the net learns from the rated plays. Accordingly, the coach's philosophy can be adopted through a neural network. The implementation of the neural network may be performed in R-Studio, Microsoft Azure Machine Learning Studio, and/or the like. The result is a system, that is able to rate plays.

For a neural net, there may be at least two phases. A first phase may include a learning phase and a second phase may include a productive phase. A learning rate of the neural net, a number of hidden nodes and a number of iterations may be fixed values that are set when the neural net is created. The net uses these values during the learning phase. The learning process performed by the net includes adjusting weights of each node. A user provides rated plays to the system. Here, the user that rates the scenes has a rating function implicit in their rating. The net auto adjusts the weights of the nodes in the net until the net represents the rating function (that is not explicitly given) of the user. In some examples, the learning process may be a backpropagation process in which random weights are initially used. As a result, the first result is random. Because of the given rating for the play provided by the user, the net is net knows that the result is wrong and tries to adjust the weights to become more equal to the given rating.

This process can be repeated with each input rated play provided by the user. The number of iterations says how often all the passes will be repeated. This number is important because if there are not enough learning iterations the net is not be able to adjust the weights. However, if there are too many iterations the net result for unknown scenes is wrong because the net adjusts its weights to precisely and is not able to abstract the learned rating to unknown passes.

The learning rate is also an important value. It determines how big the adjustments of a weight in a learning process is done. So a big learning rate refers to a greater adjustment from each scene. If the learning rate is too small, the net adjust its weights very slow and it takes a lot of iterations. However, if the learning rate is too big the net may over jump the correct weight and the weight adjustment may toggle between too big and too small. In some examples, the number of hidden nodes must be given before the learning process starts. The more nodes a net has, the more learning examples, iterations etc. it needs to adjust all the weights. According to various aspects, a minimum number of hidden nodes should be found.

When the net has finished it's learning process (learning phase) the productive phase starts. During the productive phase the weights of the nodes are fixed. Here, the net receives data about an unrated scene/play and rates the scene based on the adjusted weights.

According to various embodiments, provided herein is a classification device and application for classifying scenes from sports related video content. The classification application may learn from a subset of scenes which are manually rated by a user such as a coach or an expert. Based on the manually rated scenes, the classification application can determine a rating for an unrated scene. For example, a coach may manually rate a subset of plays from a match that are relevant to the coach. Based on these relevant plays, the classification application can easily identify other relevant plays in the match by distinguishing the plays in a feature space such that a user viewing a data point corresponding to a play in the feature space can quickly identify a rating of the play. As a result, a dynamic coaching philosophy and interests can be applied to video content of a sporting event by the classification application thus simplifying the time and effort of a coach or other user in identifying plays that are of interest.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing device for rating scenes of video from a sporting event, the computing device comprising:
    a storage configured to store data of a plurality of rated sports scenes;
    a processor configured to normalize the data of the plurality of rated sports scenes into a plurality of data points in dimensional space, form at least two rating groups based on the plurality of data points in the dimensional space, normalize an unrated sports scene into a data point, and determine a rating for the unrated scene by comparing the data point of the unrated scene to the at least two rating groups in the dimensional space; and
    an output configured to output information about the determined rating for the unrated sports scene to a display of a user device.

2. The computing device of claim 1, wherein the data of the plurality of sports scenes comprises, for each scene, Extensible Markup Language (XML) data.

3. The computing device of claim 1, wherein the processor is configured to normalize the data of each rated sports scene based on a plurality of predetermined features of the scene to generate a data point in a multidimensional feature space in which each predetermined feature represents a dimension in the feature space.

4. The computing device of claim 3, wherein the processor is further configured to assign weights to each of the predetermined features by assigning weights to the dimensions in the multidimensional feature space.

5. The computing device of claim 1, wherein the processor is further configured to identify a first cluster of data points in the dimensional space corresponding to relevant scenes and a second cluster of data points in the dimensional space corresponding to non-relevant scenes, and determine a representative data point of a relevant scene from the first cluster and a representative data point of a non-relevant scene from the second cluster.

6. The computing device of claim 5, wherein the processor is further configured to determine a center of the first cluster of data points in the dimensional space as the representative data point of a relevant scene, and determine a center of the second cluster of data points in the dimensional space as the representative data point of a non-relevant scene.

7. The computing device of claim 5, wherein the processor is further configured to determine whether the unrated sports scene is a relevant scene or a non-relevant scene based on a distance between the data point corresponding to the unrated scene and the representative data point of the relevant scene and a distance between the data point corresponding to the unrated scene and the representative data point of the non-relevant scene.

8. The computing device of claim 1, wherein the output is configured to output a table comprising a row representing the unrated sports scene, and a plurality of columns representing a plurality of predetermined features of the unrated sports scene including the determined rating.

9. A method for rating scenes of video from a sporting event, the method comprising:
    receiving data of a plurality of rated sports scenes;
    normalizing the data of the plurality of rated sports scenes into a plurality of data points in dimensional space, and forming at least two rating groups based on the plurality of data points in the dimensional space;
    normalizing an unrated sports scene into a data point;
    determining a rating for the unrated scene by comparing the data point of the unrated scene to the at least two rating groups of data points in the dimensional space; and
    outputting information about the determined rating for the unrated sports scene to a display of a user device.

10. The method of claim 9, wherein the data of the plurality of sports scenes comprises, for each scene, Extensible Markup Language (XML) data.

11. The method of claim 9, wherein the normalizing the data of each rated sports scene is performed based on a plurality of predetermined features of the scene to generate a data point in a multidimensional feature space in which each predetermined feature represents a dimension in the feature space.

12. The method of claim 11, further comprising assigning weights to each of the predetermined features by assigning weights to the dimensions in the multidimensional feature space.

13. The method of claim 9, wherein the identifying the at least two rating groups comprises identifying a first cluster of data points in the dimensional space corresponding to relevant scenes and a second cluster of data points in the dimensional space corresponding to non-relevant scenes, and determining a representative data point of a relevant scene from the first cluster and a representative data point of a non-relevant scene from the second cluster.

14. The method of claim 13, wherein the identifying further comprises determining a center of the first cluster of data points in the dimensional space as the representative data point of a relevant scene, and determining a center of the second cluster of data points in the dimensional space as the representative data point of a non-relevant scene.

15. The method of claim 13, wherein the determining comprises determining whether the unrated sports scene is a relevant scene or a non-relevant scene based on a distance between the data point corresponding to the unrated scene and the representative data point of the relevant scene and a distance between the data point corresponding to the unrated scene and the representative data point of the non-relevant scene.

16. The method of claim 9, wherein the outputting comprises outputting a table comprising a row representing the unrated sports scene, and a plurality of columns representing a plurality of predetermined features of the unrated sports scene including the determined rating.

17. A non-transitory computer readable medium having stored therein instructions that when executed cause a computer to perform a method for rating scenes of video from a sporting event, the method comprising:

receiving data of a plurality of rated sports scenes;

normalizing the data of the plurality of rated sports scenes into a plurality of data points in dimensional space, and forming at least two rating groups based on the plurality of data points in the dimensional space;

normalizing an unrated sports scene into a data point;

determining a rating for the unrated scene by comparing the data point of the unrated scene to the at least two rating groups of data points in the dimensional space; and outputting information about the determined rating for the unrated sports scene to a display of a user device.

18. The computer-readable medium of claim 17, wherein the data of the plurality of sports scenes comprises, for each scene, Extensible Markup Language (XML) data.

19. The computer-readable medium of claim 17, wherein the normalizing the data of each rated sports scene is performed based on a plurality of predetermined features of the scene to generate a data point in a multidimensional feature space in which each predetermined feature represents a dimension in the feature space.

20. The computer-readable medium of claim 17, wherein the outputting comprises outputting a table comprising a row representing the unrated sports scene, and a plurality of columns representing a plurality of predetermined features of the unrated sports scene including the determined rating.

* * * * *